United States Patent [19]

Matthews

[11] 3,722,550
[45] Mar. 27, 1973

[54] COMPOSITE TUBING AND METHOD FOR MAKING THE SAME

[75] Inventor: Richard A. Matthews, Chagrin Falls, Ohio

[73] Assignee: Samuel Moore and Company, Mantua, Ohio

[22] Filed: Mar. 10, 1970

[21] Appl. No.: 18,272

[52] U.S. Cl. ................... 138/137, 138/141, 156/308
[51] Int. Cl. ............................................... F16l 11/04
[58] Field of Search .................... 138/124–127, 129, 138/130, 132, 137, 141; 156/308

[56] References Cited

UNITED STATES PATENTS

| | | | |
|---|---|---|---|
| 3,116,760 | 1/1964 | Matthews | 138/125 |
| 3,500,867 | 3/1970 | Elson | 138/125 |
| 3,245,431 | 4/1966 | Coe | 138/125 |
| 3,310,447 | 3/1967 | Matthews | 138/125 X |
| 2,470,599 | 5/1949 | Billmeyer | 138/130 X |
| 3,489,631 | 1/1970 | Chen et al. | 156/308 X |

FOREIGN PATENTS OR APPLICATIONS 562,328   6/1944   Great Britain .................. 138/130

Primary Examiner—Houston S. Bell, Jr.
Attorney—Teare, Teare & Sammon

[57] ABSTRACT

A composite tubing product and method for making the same, the tubing includes an elastomeric polyurethane inner core tube having a peripheral zone of elastomeric, adhesively activated core tube material on the outer surface of the tube, a stranded reinforcement layer elastomerically secured to the core tube by the adhesively activated material, and an outer sheath disposed around the reinforcement layer. In another form, an additional reinforcement layer may be disposed around the first reinforcement layer, and such additional layer is generally free of securement to the first layer.

5 Claims, 5 Drawing Figures

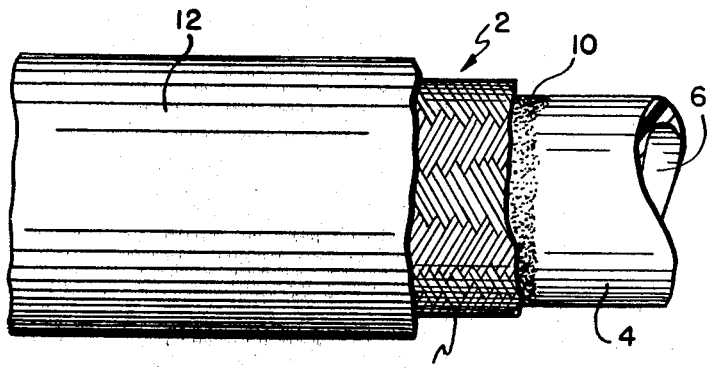
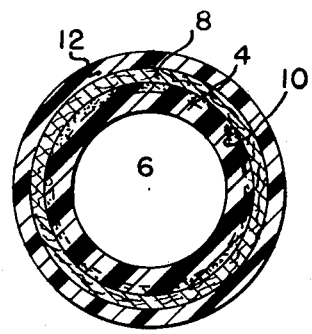
FIG.1          FIG.2
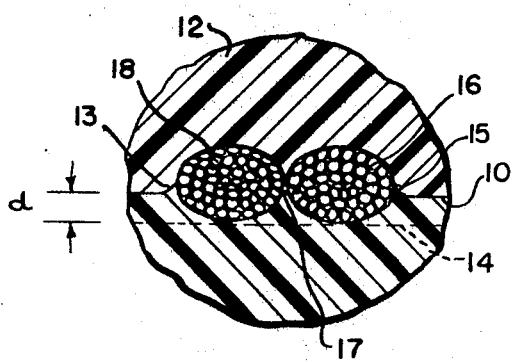
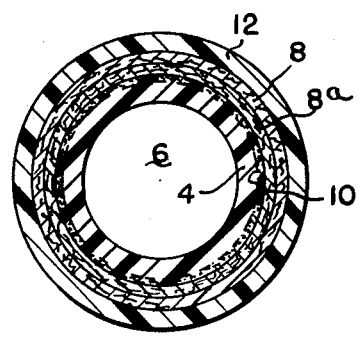
FIG.3          FIG.4
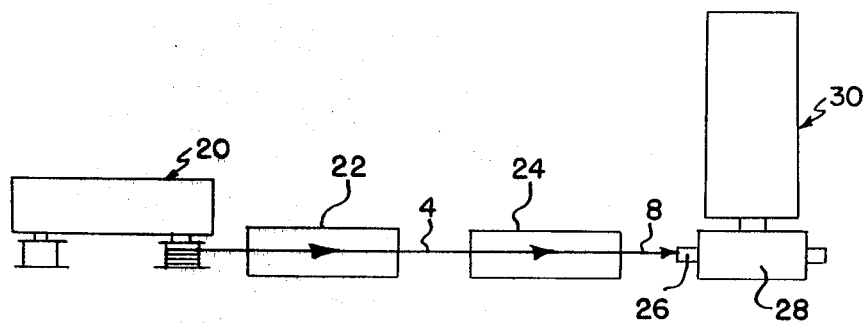
FIG.5
INVENTOR.
RICHARD A. MATTHEWS
BY
Teare, Teare & Sammon
ATTORNEYS

COMPOSITE TUBING AND METHOD FOR MAKING THE SAME

BACKGROUND OF THE INVENTION

The present invention generally relates to a composite tubing product and method for making the same of the type adapted for high pressure fluid transmission, particularly under transient pressure surge conditions. More specifically, the present invention relates to a composite tubing product of the type which incorporates improved flexibility, kink resistance and kink relaxation characteristics. The present invention is related to and constitutes an improvement over the U. S. Pat. to R. A. Matthews, No. 3,310,447, issued Mar. 21, 1967.

Heretofore, various types of stranded reinforcements have been provided in secured relation with respect to an inner core tube by means of adhesive materials. However, since such prior adhesive materials are formed of multiple components, ancillary equipment and mixing devices have been required to enable use thereof. For example, in continuously formulating such adhesive materials, as in the manufacture of continuous lengths of composite tubing, complex mix-metering devices have been required. In addition, due to the relatively short pot life of certain of these adhesive materials, it is required that continuous formulation of the required amounts be carried out in order to achieve efficient and economical production of continuous length tubing. Furthermore, in those instances where components of the adhesive material have noxious, toxic or otherwise dangerous characteristics, such as with those of the polyurethane prepolymers, the use of such type of adhesive materials presents a serious health problem requiring expensive and time consuming precautionary procedural measures.

More recently, stranded reinforcements have also been secured in the making of composite tubing by solvent bonding techniques. By such techniques, by the use of a given solvent the material of the core tube was softened to enable the reinforcement to be secured thereto. Such techniques though suitable for certain applications were not entirely satisfactory and have presented certain difficulties. For example, since the softening action of the solvent tended to dissolve the material of the core tube, such efforts necessitated the proper dilution and heating of the solvent in order to confer proper activity to the solvent during the softening process. Furthermore, subsequent washing and/or cleaning of the core tube-reinforcement was required in order to remove the solvent, thereby adding additional process steps and expense to the manufacture of the tubing, particularly with respect to relatively high speed production of continuous length tubing.

For patents relating to prior methods for manufacturing composite tubing, reference may be had to the U. S. Pat. No. 2,977,839 to Koch, issued Apr. 4, 1961, and U.S. Pat. No. 3,116,760 to R. A. Matthews, issued Jan. 7, 1964.

SUMMARY OF THE INVENTION

The present invention relates to an improved construction for a composite tubing product and method for making the same which comprises an elastomeric inner core tube, at least one layer of stranded reinforcement elastomerically secured to said inner core tube, and an outer sheath disposed around the reinforcement layer and providing a protective cover therefor. In the invention, the elastomeric securement of the stranded reinforcement layer to the inner core tube comprises a peripheral zone of adhesively activated, elastomeric, core tube material which coacts with the core tube to enable the strands of the reinforcement layer to become partially embedded therein. In the invention, the stranded reinforcement may comprise one or more layers, as desired.

From the following description and accompanying drawings, it will be seen that the present invention provides an improved construction for a composite tubing product and method for making the same for high pressure fluid transmission in which transient pressure surge conditions exist. The tubing product of the present invention has improved flexibility, kink resistance, and kink relaxation characteristics, particularly under relatively high pressure and/or pressure surge conditions and within a relatively wide temperature range. The tubing product of the present invention is produced by a method which eliminates the need for multiple-component adhesive materials and their attendant complex processing equipment and safety requirements. In addition, the tubing product of the present invention can be efficiently and economically produced by continuous mass production techniques without the requirement of solvent materials having precise softening activity or the like. Moreover, the instant invention provides a high strength composite tubing product having considerably greater improved flexibility and resistance to "crimp" as compared to heretofore known arrangements for high strength tubing under varying temperature and pressure conditions.

BRIEF DESCRIPTION OF THE DRAWINGS

FIG. 1 is a fragmentary view partially in section and partially cut away of a composite tubing product produced in accordance with the present invention;

FIG. 2 is a transverse, cross sectional view taken generally along the line 2—2 of FIG. 1;

FIG. 3 is a highly magnified sectional illustration of the condition of the layers of the materials forming the composite tubing of FIGS. 1 and 2 when the latter is in the straight line condition of FIG. 1;

FIG. 4 is a transverse vertical section view showing a modified form of the composite tubing product made in accordance with the present invention; and FIG. 5 is a more or less diagramatic view of an apparatus disposed in an organized system for making the composite tubing product in accordance with the present invention.

DESCRIPTION OF THE PREFERRED EMBODIMENTS

Referring now again to the drawings, and more particularly to FIGS. 1 and 2 thereof, there is shown a piece of composite tubing, designated generally at 2, made in accordance with the instant invention. As shown, the product comprises an inner tube or core 4 having a generally central passageway 6 adapted for transmitting fluid therethrough. Surrounding the tube 4 is a fibrous reinforcing sleeve member or layer 8 comprising a plurality of strands or "yarns" as they are known in the art, which in the embodiment illustrated have been machine braided about the tube 4, using a regular weave.

Now in accordance with the invention, an elastomeric peripheral bondment zone, designated generally at 10, forming an integral part of the core tube 4 acts to bond the reinforcement layer 8 to the core tube. This zone 10 is of a generally annular configuration and is provided by a special adhesive activation of the material of the core tube 4 so as to provide, in effect, a partial mechanical capsulation of the strands of the reinforcing material so as to effectively bond the reinforcement layer 8 to the core tube. In the form shown, an outer sheath 12 may be formed, such as by extrusion, over the reinforcing layer 8 to provide a protective cover for the tubing product, as desired.

The inner core tube 4 is preferably made from extrudable resin materials which combine good elastomeric characteristics with selective resistance to attack by the fluids to be transmitted therethrough. Moreover, such materials should retain such properties while incorporating an ability for selective adhesive activation in accordance with the instant invention. A preferred material which may be advantageously employed is an elastomeric, thermoplastic polyurethane material, such as one derived from a polyester, an inner ester or a polyether. In the invention, polyurethane resins which are useable may include compounds of "-TEXIN" commercially available from the Mobay Chemical Company of Pittsburgh, Pa. Further description of such compounds may be had by reference to the U. S. Pat. 3,116,760 to R. A. Matthews, as aforesaid.

In the invention, it is preferred that such polyurethane materials have property characteristics generally as follows:

| | |
|---|---|
| Modulus at 50% elongation in p.s.i. | 900 to 2,000 |
| Hardness-Shore | 45D to 60D |
| Preferred Hardness-Shore | 49D to 53D |
| Ultimate tensile strength in p.s.i. at ambient temperature | 6000 to 10,000 |
| Ultimate elongation at ambient temperature | 250% to 500% |
| Vicat softening point | 230°F to 340°F |

The core tube 4 made from such polyurethane material may have a nominal internal diameter in a range from approximately three-sixteenths of an inch to approximately 1 inch with a nominal wall thickness in a range from approximately 20 mils to approximately 90 mils. Preferably, the nominal wall thickness should be in the range between 30 mils and 70 mils.

The material for the reinforcing layer 8 is preferably comprised of polymeric strands, as at 16 and 18 of FIG. 3. Preferably, the strand material is composed of polyester filaments, such as poly(alkylene terephthalate)ester fiber or more specifically poly(ethylene terephthalate)ester fiber, commonly available under the trade name "Dacron" or of polyamide filaments, such as nylon. The reinforcing layer is also preferably of the woven or braided type illustrated and the individual strands or "yarns" of the braided material are preferably of the floss-type with each formed of a substantial plurality of individual filaments (FIG. 3) which are moveable or mobile with respect to one another. The reinforcing material should have a straight tenacity of between approximately 6 grams per denier and approximately 12 grams per denier, with a tenacity between 8 grams per denier and 10 grams per denier, being preferred. The strands of the reinforcing material are preferably disposed in tensioned relation about the core tube 4, thereby providing minimum volumetric expansion during use of the tubing. In addition, such tensioned relation causes the strands of the reinforcing material to assume a non-circular, such as oblate shape, which are partially capsulated within the controlled adhesive activation zone 10 provided on the core tube, as will be described hereinafter.

Now in accordance with the invention, the controlled adhesive activation zone 10 is provided by a special adhesive activation material or agent. This material permeates into the material of the core tube 4 in a direction from the outer periphery toward the longitudinal central axis of the tube so as to provide the peripheral, such as annular, control zone 10. Accordingly, such material penetrates into the material of the core tube to a depth sufficient to provide a partial capsulation of and mechanical bonding with the strands, as in FIG. 3. This activation causes the formation of exuded meniscus areas, as at 13, 15 and 17, between adjacent strands which enhances the mechanical adhesion thereof to the core tube. The partial capsulation should constitute from between about 5 to 75 percent of the exposed peripheral surface area of the strands with the preferred range being 10 percent to 30 percent of such area.

In accordance with the invention, since the softening effect of the activation material progressively diminishes as it permeates into the material of the bore tube 4 from its outer periphery, a physical properties gradient is, in effect, provided between the adhesively activated exterior surface of the core tube and the non-activated internal portion of the core tube. The lower limit of such permeation is graphically illustrated in the dotted line representation, as at 14 of FIG. 3, which corresponds to the depth $d$ of the control zone 10. This physical property gradient acts to elastomerically couple the strands of the reinforcing layer 8 to the core tube 4 in a manner so as to enable the exposed surfaces of the strands comprising the reinforcing layer 8 to be, in turn, partially capsulated by the outer sheath 12 which is subsequently extruded over the reinforcing layer 8. Initial adhesive activation of the zone 10 provides a relatively high viscous structure which transforms into an elastomeric solid structure as the core tube ages. After such activation, the zone incorporates an elastomeric, physical properties gradient with progressively reduced viscosity in a direction from the outer periphery of the core tube toward the central axis thereof to provide the desired partial capsulation of the strands which lie near the core tube.

The adhesive activation agent or material of this invention should have the dual function of being capable of permeating the material of the core tube 4 while at the same time adhesively activating such material. In other words, the material should be capable of softening the material of the core tube while being capable of activating the core tube material to effectively adhere to strands of the reinforcing layer 8. Preferably, the material is one which should be capable of adhesive activation at room temperature. It has been found that excessive softening activity of the activation material should be prevented since the softening of the entire core tube wall and impairment of its ability for high pressure transmission would result. In addition, the activation material is preferably a liquid which has a low vapor pressure from room temperature to elevated temperatures, such as to 150°F, so that the material can be readily applied, yet permeate and activate the core tube material prior to evaporation thereof.

In accordance with the invention, preferred materials for the activation ingredient where the core tube is made from polyurethane materials include the pyrrolidones. Preferably, the material is N-methyl pyrrolidone, which is a polyurethane solvent and liquid at room temperature and which has a low vapor pressure at room temperature to prevent excessive evaporation. Preferably, the material has a vapor pressure sufficiently low enough so that activated core tube material remains on the core tube periphery for a period between approximately 7 seconds and approximately 10 minutes. In the invention, it has been found that the activation material may be heated to an elevated temperature, such as 150°F., or diluted with a diluent, such as methylene chloride or acetone or the like. For example, the activation material may include a solution containing 30 parts by weight of N-methyl pyrrolidone and 70 parts by weight of methylene chloride. By this arrangement, though the pyrrolidone material may be used alone, the use of a diluent may be employed to further control the penetration of the pyrrolidone into the material of the core tube so as to achieve a maximum bond level without causing excessive penetration into the core tube material, and hence, to provide the physical properties gradient therein. It has been found that the pyrrolidone material provides a thin layer of oil-like characteristics which does not substantially evaporate, but which effectively penetrates or permeates into the material of the core tube. By the addition of a diluent, such as methylene chloride, a certain amount of the pyrrolidone material has been observed to have been evaporated off along with the diluent, thereby controlling the depth of the zone 10 and the accompanying physical properties gradient.

In the invention, the outer sheath 12 of the composite tubing 2 is preferably formed of the same general composition as used in production of the inner core tube 4. Preferably, the sheath 12 is extruded over the reinforcing layer 8 and there is a nominal wall thickness in the range between approximately 10 mils and approximately 60 mils with a thickness of approximately 30 mils being preferred. The outer sheath may be adhesively bonded to the adjacent underlying reinforcement layer 8, such as by an elastomeric polyurethane adhesive material of the type mentioned in the aforementioned U. S. Pat. No. 3,116,760.

In FIG. 4 there is shown a modification of the composite tubing of the present invention, which is generally similar to that described in connection with FIGS. 1–3 wherein like parts are designated by like reference characters. In this form, the inner core tube 4 is similarly provided with a reinforcing layer 8 which is bonded to the core tube by the control zone 10 of the invention, except that a second fibrous reinforcement layer 8a has been disposed in encompassing relation around the underlying layer 8. Preferably, the outer reinforcing layer 8a is made of the type of material and has the type of weave as heretofore described. Here again, the dual reinforcing layer construction is surrounded by an outer sheath 12 for the purposes and advantages, as aforesaid. Optionally, the outer sheath may be bonded to the outer reinforcing layer 8a, such as by an elastomeric polyurethane adhesive material. In this form, however, it is preferred that the reinforcing layer 8 be free of any bonded securement with respect to the outer reinforcing layer 8a so as to enable relative axial movement between the respective layers, thereby to provide relative axial movement of the inner core tube 4 and reinforcing layer 8, as a unit, relative to the outer layer 8a and sheath 12. The activation material has no appreciable effect on the strands of the reinforcing material, and hence, the control zone 10 and the first layer 8 together act as a barrier to provide a bearing surface for relative movement of the outer layer 8a. This gives a very good bond level, yet enables the other layers to slip relative to the core tube. Preferably, the depth $d$ of the zone is between 3 to 15 mils. By this arrangement, the composite tubing product has high strength and kink resistant characteristics while incorporating maximum flexibility characteristics.

In FIG. 5 there is diagrammatically illustrated an apparatus in an organized system for producing the composite tubing product in accordance with the instant invention. Preliminarily, the inner core tube 4 may be formed by extrusion and preferably placed under an internal air pressure of predetermined value, as described in the aforementioned U.S. Pat. No. 3,116,760.

Thus formed, a reel of extruded elastomeric polyurethane inner core tubing may be mounted on a payoff stand 20 of a conventional type for delivery to an adhesive activation station 22. In this regard, it is to be noted that the core tube 4 may be alternatively extruded as a first step in the method for continuous operation thereof. In such case, the core tube 4 may be internally pressurized to provide an internal support therefor. Preferably, in such case, the internal pressure would be maintained at approximately 70 p.s.i. throughout the operation. In some cases, it may be desirable to maintain such internal pressure on the finished product in order to ensure a good bond between the reinforcement and the core tube.

At the station 22, the entire external periphery of the core tube 4 is directly exposed to an open bath of the adhesive activation material. Moreover, the tubing is exposed to the activation material, which is in liquid form, for a time sufficient to provide the control zone 10 in the material of the core tube. It has been found that the duration of such direct exposure of the core tube 4 to the activation material may constitute a soak time in the range from approximately 2 seconds to approximately 1 minute, with a soak time from approximately 3 seconds to approximately 15 seconds being preferred. Preferably, the bath of activation material during the period of exposure is held at room temperature. If desired, the temperature of the bath may be elevated, such as to 150°F, without impairment to the bond level, as aforesaid. Since the activation material of the present invention is in a liquid form having a low vapor pressure from room temperature to an elevated temperature, such as 150°F, evaporation of the material from the bath and/or from the surface of the core tube is minimized. The bath may have a length of 5 inches to 4 feet with the feed rate through the bath being about 2 to 8 ft./min. dependent on the braiding machine and the soak time in the bath to achieve the desired bond level.

After the core tube has been sufficiently exposed to the activation material within the bath to initiate creation of the control zone 10, it may be subjected to a wiping operation (not shown) such as by means of a wiping die or the like, as known in the art. Such wiping action reduces the amount of activation material to which the core tube 4 is exposed to a thin film in the range of approximately 1 to 8 mils. Preferably, this wiping action also commences a period of indirect exposure of the core tube 4 to the activation material of from approximately 25 seconds to 4 minutes prior to application of the reinforcement layer 8. During this period, the activation material continues to penetrate or permeate into the material of the core tube 4 so as to provide the physical properties gradient in the control zone 10. Accordingly, it has been found that the total elapsed time during which the outer periphery of the core tube 4 may be exposed to the activation material prior to application of the reinforcement material should be in the range between approximately 7 seconds and approximately 10 minutes with the time preferably being between approximately 28 seconds and approximately 255 seconds. By this arrangement, it has been found that there is provided the preferred partial capsulation of the strands of the reinforcing material within the control zone 10 while enabling the exposed surfaces of the strands to, in turn, be partially capsulated by the material of the outer sheath 12 upon subsequent extrusion of the sheath over the reinforcement material, thereby to provide an effective mechanical coacting coupling between the material of the core tube and the material of the outer sheath with respect to the strands of the reinforcement material.

From the station 22 the now adhesively activated core tube 4 is passed to a braiding mechanism 24, such as of the Wardwell type, for application of one or more reinforcing layers to the core tube. Alternatively, the reinforcement material may be applied in the form of non-woven radial or helical strands as described in the co-pending application Ser. No. 693,040 to Richard A. Matthews filed Nov. 30, 1967. Preferably, the strands of the reinforcing material are applied under a tension, such as from about 1 pound to 6 pounds, so that the strands are caused to be partially capsulated in the material of the core tube 4.

It has been found that a predetermined period of time should elapse after application of the reinforcement material and prior to subsequent processing operations to ensure complete permeation of the activation material to provide the control zone 10 and to enable substantially complete evaporation of the activation material, thereby to provide the optimum bond level between the core tube and the reinforcement material. Preferably, this time should be between about 8 hours to 36 hours.

From the braiding apparatus 24 the reinforced core tube is passed to an extrusion machine 30. The extrusion machine may be of a more or less conventional type embodying a cross head 28 and a die orifice 26 as described in the aforementioned U.S. Pat. No. 3,116,760. From the head 28 the outer sheath 12 is extruded over the reinforcing material 8 of the core tube to provide the finished composite tubing product 2. From the head 28 the sheathed tubing may then be allowed to cool to ambient temperature or cooled in a water bath (not shown), whereupon, the finished tubing product may then be suitably marked and stored in a manner as known in the art.

From the foregoing description, it will be seen that the present invention is a novel process for making a new and improved fiber reinforced composite tubing structure having a polyurethane core tube and a polyester reinforcement bonded to the tube by an adhesive activated control zone. Such control zone incorporates an elastomeric physical properties gradient which enables yieldable or resilient movement of the strands of the reinforcement relative to one another upon flexure of the core tube to provide good flexibility and kink resistance characteristics to meet specific conditions, such as for application to the fittings or couplings. Moreover, in the invention the strands or filaments in contact with the core tube are actually partially capsulated in the tube, but in a manner to have sufficient resilient movement together with the outer remaining strands or filaments which are free to move with respect to one another, thereby to minimize rigidity and physical deterioration of the finished product in actual usage.

Accordingly, the control zone 10 together with the meniscus areas 13, 15, 17, etc., which forms a part thereof, provide an elastic elastomeric, envelope-like structure to enable controlled relative movement of the strands of the reinforcement partially capsulated therein upon flexure of the core tube. Since formation of this elastomeric control zone has little or no effect on the strands of the reinforcement, strands in other outer layers of reinforcement are free to slip relative to one another, thereby providing a reinforcement for the tubing which has progressively increased flexibility in a direction away from the central axis of the core tube, but which, at the same time, has a positive yet elastic securement to the core tube to achieve a good bond level.

I claim:

1. A reinforced composite tubing product of generally uniform construction and of indeterminate length having improved flexibility and which is particularly adapted for pressurized fluid transmission under transient pressure surge conditions, said tubing product comprising:

I. an inner core tube having a fluid-conducting central passageway extending therethrough,
   A. said core tube being made from a thermoplastic, elastomeric, polyurethane material;
II. at least one fibrous reinforcement layer composed of strands encompassing the core tube in generally uniformly tensioned engagement,
   A. each of the strands comprising a plurality of filaments twisted together to provide the strands;
   B. the filaments being made from a thermoplastic, synthetic polymeric material:
III. an elastic, polyurethane solvent-formed bondment elastomerically securing the reinforcement layer to the exterior material of the core tube, A. the bondment consisting essentially of thermoplastic polyurethane core tube material so that the bondment comprises the exterior material of the core tube and partially capsulates at least some of the adjacent strands with elastomeric polyurethane material to provide:
   i. controlled elastic mobility to the partially capsulated strands with respect to the core tube,
   ii. controlled elastic mobility to the partially capsulated strands with respect to each other upon flexure of the core tube, and
   iii. yieldable mobility to the filaments in each of the partially capsulated strands relative to each other,
B. the partially capsulated strands being capsulated to a depth which is less than the corresponding wall thickness of the core tube; and
IV. an outer protective sheath encompassing the reinforcement layer and comprising a thermoplastic, synthetic polymer material.

2. A composite tubing product in accordance with claim 1, wherein
said product further comprises:
at least a second reinforcement layer disposed in encompassing relation around said first mentioned layer, and
said second reinforcement layer being substantially free of bonded securement to said first mentioned layer; and
the outer sheath disposed in encompassing engagement with the second reinforcement layer.

3. A composite tubing product in accordance with claim 2, including
an elastomeric polyurethane adhesive material bonding said sheath to said second reinforcement layer.

4. A composite tubing product in accordance with claim 1, wherein
each of the strands of said reinforcement layer which engages said core tube has from about 5 percent to about 75 percent of its exposed peripheral surface area capsulated in said bondment.

5. A composite tubing product in accordance with claim 1, wherein,
said thermoplastic, elastomeric polyurethane core tube material has an ultimate tensile strength of at least about 6,000 pounds per square inch at ambient temperature.

* * * * *